US012184509B2

(12) United States Patent
Shori et al.

(10) Patent No.: US 12,184,509 B2
(45) Date of Patent: Dec. 31, 2024

(54) MACHINE LEARNING MONITORING OF WIRELESS NETWORK INFRASTRUCTURE APPLICATION SERVERS

(71) Applicant: T-Mobile USA, Inc., Bellevue, WA (US)

(72) Inventors: Sakshi Shori, Plano, TX (US); Vijay Veggalam, Parsippany, NJ (US)

(73) Assignee: T-Mobile USA, Inc., Bellevue, WA (US)

( * ) Notice: Subject to any disclaimer, the term of this patent is extended or adjusted under 35 U.S.C. 154(b) by 58 days.

(21) Appl. No.: 17/745,277

(22) Filed: May 16, 2022

(65) Prior Publication Data

US 2023/0370338 A1 Nov. 16, 2023

(51) Int. Cl.
*H04L 41/16* (2022.01)
*H04L 41/0659* (2022.01)
*H04L 41/147* (2022.01)

(52) U.S. Cl.
CPC .......... *H04L 41/16* (2013.01); *H04L 41/0661* (2023.05); *H04L 41/147* (2013.01)

(58) Field of Classification Search
CPC .... H04L 41/16; H04L 41/0661; H04L 41/147
See application file for complete search history.

(56) References Cited

U.S. PATENT DOCUMENTS

| 10,397,043 | B2 * | 8/2019 | Tapia | ................. | H04L 41/5074 |
| 2006/0285489 | A1 * | 12/2006 | Francisco | ............. | H04L 45/851 |
| | | | | | 370/465 |

| 2016/0050587 | A1 | 2/2016 | Lam | | |
| 2018/0368037 | A1 | 12/2018 | Wang | | |
| 2019/0213504 | A1 * | 7/2019 | Vasseur | ................... | H04L 41/16 |
| 2020/0120000 | A1 * | 4/2020 | Parthasarathy | ......... | H04L 67/10 |
| 2020/0413325 | A1 | 12/2020 | Meredith | | |
| 2021/0168684 | A1 | 6/2021 | Kang | | |
| 2022/0124574 | A1 | 4/2022 | Veggalam et al. | | |

(Continued)

FOREIGN PATENT DOCUMENTS

| CN | 110662264 A | 1/2020 |
| CN | 117412365 A | 1/2024 |

(Continued)

*Primary Examiner* — Bryan Y Lee
(74) *Attorney, Agent, or Firm* — Lee & Hayes, P.C.

(57) ABSTRACT

Machine learning systems and techniques are described herein for monitoring application servers within the computing infrastructure of a wireless network. A machine learning system may train and execute models based on performance metrics, error data, and failures from application servers configured to perform various functions relating to communication session authorization, monitoring, and charging for voice, data, and messaging communication services over the wireless network. Machine learning models may be configured to predict service degradations, detect performance anomalies, and determine root causes, and various models may output particular application servers, components, and/or predicted times of certain events. Based on the outputs of the machine learning models, the machine learning system may perform various actions for the wireless network infrastructure, including data outputting and/or executing processes on the application servers to analyze, restart, and/or repair particular components.

20 Claims, 7 Drawing Sheets

(56) References Cited

U.S. PATENT DOCUMENTS

| | | | |
|---|---|---|---|
| 2023/0074288 A1* | 3/2023 | Filippou | H04W 28/0236 |
| 2023/0078661 A1* | 3/2023 | Wei | G06F 16/3347 |
| | | | 709/223 |
| 2023/0377460 A1 | 11/2023 | Sivanesan | |

FOREIGN PATENT DOCUMENTS

| | | |
|---|---|---|
| WO | WO2013024408 A1 | 2/2013 |
| WO | WO2021194176 A1 | 9/2021 |

\* cited by examiner

Service Level Dashboard – Data Drilldown

| OCC Data Success Rate | SDP Data GY Success Rate | SDP Data GY-RAR Success Rate | SDP Data SY Success Rate | SDP Data SNR Success Rate |
|---|---|---|---|---|
| 99.30% | 99.989% | 100.0% | 100.0% | 100.0% |

OCC GY Success Rate: 99.71%

| GY Initial Requests | GY Initial Errors | GY Update Requests | GY Update Errors | GY Term Requests | GY Term Errors | GY RAR Requests | GY RAR Errors |
|---|---|---|---|---|---|---|---|
| 265.29 M | 60.0 K | 2.44 B | 102 K | 265.26 M | 54.8 K | 39.28 M | 41.4 K |

OCC GY Success Rate: 99.60%

| SY-SL Requests | SY-SLR Errors | SY SNR Requests | SY-SNR Errors | SY-ST Requests | SY STR Errors |
|---|---|---|---|---|---|
| 324.76 M | 11,753 | 15.85 M | 3,107 | 324.44 M | 234,419 |

FIG. 7

MACHINE LEARNING MONITORING OF WIRELESS NETWORK INFRASTRUCTURE APPLICATION SERVERS

BACKGROUND

Modern telecommunications networks such as cellular telephone networks can support a variety of types of communications sessions, including voice, video, data, and/or messaging sessions. For example, second-generation (2G) and third-generation (3G) cellular networks, such as Global System for Mobile Communications (GSM) networks or Universal Mobile Telecommunications System (UMTS) networks may carry generally stream media over circuit-switched connections. In contrast, fourth-generation (4G) cellular networks such as Long Term Evolution (LTE) networks and fifth-generation (5G) cellular networks such as the Third-Generation Partnership Project (3GPP) 5G System may generally carry streaming media over packet-switched connections which can provide greater speed and throughput than circuit-switched connections. Certain networks may include a single radio access technology while others may include wireless access networks spanning multiple technology generations, for example, due to the substantial infrastructure investment needed to expand cellular networks.

To provide wireless network service to subscribers, a provider may maintain access networks, a core network, a service network including a backend computing infrastructure. The access network and core network may include the network components to initiate connections and provide various communication services (e.g., voice, data, and messaging services), and the backend computing infrastructure of the service network may include a number of application servers configured to authorize requests, monitor and track communication sessions, perform charging services, and manage subscriber data. The application servers (or nodes) of the computing infrastructure may operate in combination to authorize, manage, track, and charge subscribers for the communication services provided via the core and access networks. Due to the interconnectivity of application servers performing these functions, and the reliance of the core network on the application servers, any errors or performance degradations in one application server can propagate to cause errors or performance degradations in other application servers and in the communication services provided by the core network. Such failures may manifest as reduced throughput or network speeds, reduced spectrum usage, dropped calls, and the like.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. For brevity of illustration, in the diagrams herein, an arrow beginning with a diamond connects a first component or operation (at the diamond end) to at least one second component or operation that is or can be, in at least one example, included in the first component or operation.

FIG. 7 depicts another user interface representing a service level dashboard for a telecommunications network, in accordance with one or more implementations of the disclosure.

DETAILED DESCRIPTION

Overview

Figure 1:
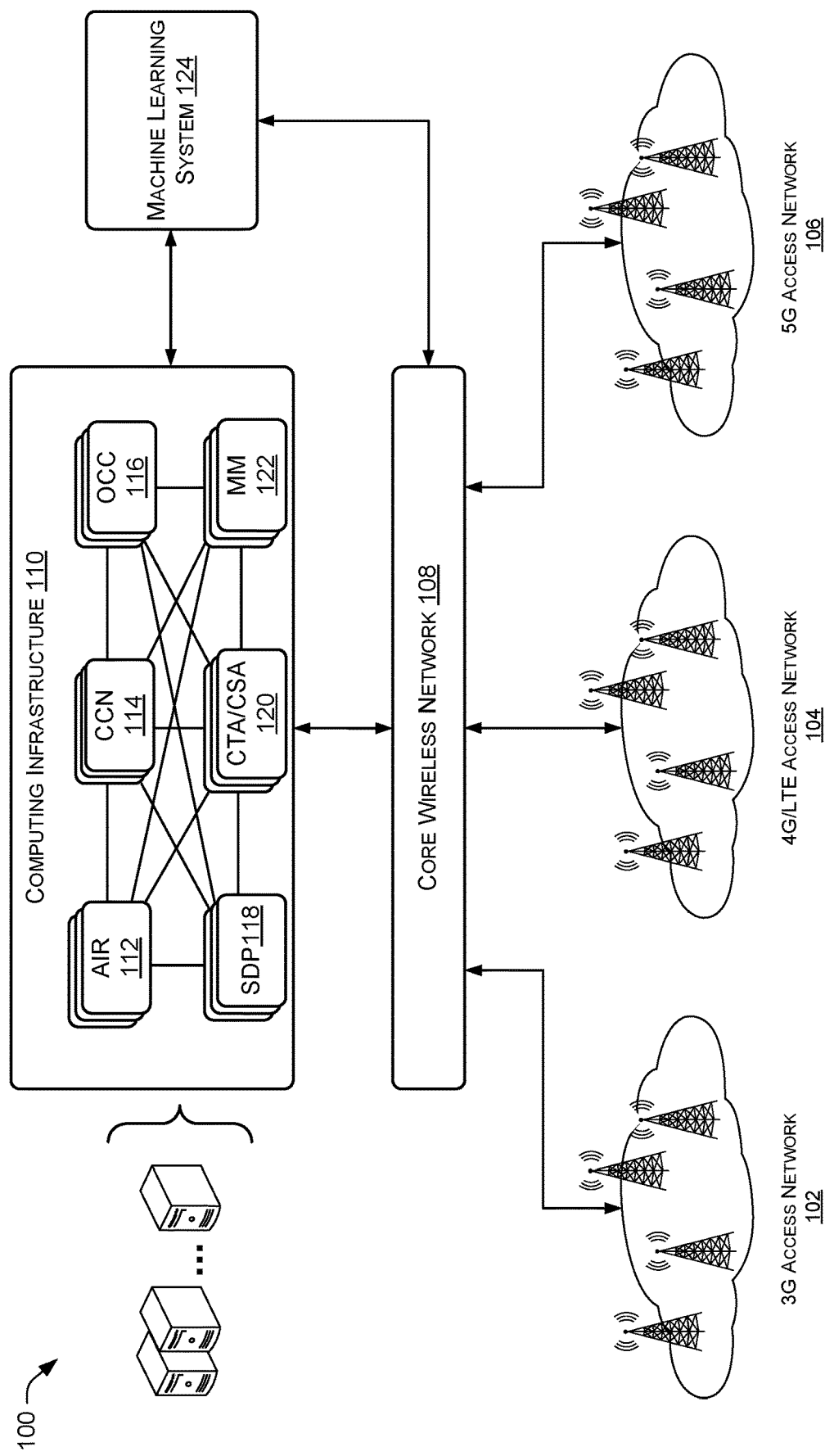
FIG. 1 is a block diagram illustrating components of an example telecommunications network architecture, including a machine learning system for training and executing ML models to detect and repair service degradations and outages, in accordance with one or more implementations of the disclosure.

Various techniques described herein relate to training and using machine learning (ML) models to monitor the computing infrastructure of a wireless network. As described in various examples herein, trained ML models may be used to quickly detect and repair service degradations and outages within a set of application servers used to provide converged voice, data, and messaging services via the wireless network. In some cases, the ML models may be trained based on performance metrics, error data, and failures from the application servers associated with the wireless network charging system, including any number of application servers (or nodes) configured to perform functionality relating to request authorization, session monitoring, and charging of communication services over voice, data, and messaging. Various ML models may be configured to predict service degradations, detect performance anomalies (e.g., failures or outages), and determine the root causes associated with such degradations and anomalies. Based on the outputs of the trained ML models, the systems herein may perform various actions including customized data outputs (e.g., end-to-end service dashboards, notifications, etc.) and executing automated processes to analyze, restart, and/or repair particular components within the computing infrastructure.

As described in more detail below, these techniques provide machine learning systems that can more quickly detect, isolate, and repair service outages within the complex service architecture of a wireless network computing infrastructure. Computing infrastructures used by wireless networks providing communication services to subscribers may include large-scale and robust service architectures. For instance, a large-scale wireless network may serve hundreds of millions of voice, data, and/or messaging requests from millions of different subscribers each day. Such wireless networks may provide receive requests and provide communication services via any number of access networks, including 2G, 3G, 4G, and 5G cellular networks, as well as WiFi networks, satellite networks, etc. For each request received and/or each communication service provided to a subscriber device, the wireless network may perform operations on a number of application servers (or nodes) in the backend computing infrastructure of the wireless network. For example, before a requested voice call or data connection is established, or before a message is sent the network may invoke application servers to confirm that the subscriber and user equipment (UE) device are recognized and compatible with the network, that the subscriber's account is active, that the subscriber and UE device are permitted to perform the requested communication, etc. Additional application servers may be used to verify the subscriber's rate plan, home network, minutes/data allocation, and any other accounts or UEs associated with the subscriber's account, so that the communication can be accurately authorized, tracked, and charged to the subscriber.

For example, for a single communication session or a message provided to/from a subscriber, the network may invoke one or several different nodes within clusters of account information and refill (AIR) system nodes, charging control node (CCN) nodes, service data point (SDP) nodes, multi mediation (MM) nodes, online charging control (OCC) nodes, and others. For different subscriber requests and/or communication sessions, depending on the particular subscriber, account, UE device, access network, region/location, communication service, and any number of other factors, various combinations of application server clusters and nodes may be invoked. Different requests and/or communication sessions can invoke the same nodes or different nodes, or may invoke nodes in different orders or with different parameters, etc.

Due to the complexity of the computing infrastructures in wireless networks, it can be technically challenging to detect or predict service degradations or anomalies, and it can be further challenging to determine the root causes of such degradations or anomalies. Error logs, service failures, and the performance metrics of individual application servers can be monitored. However, issues within a first server often propagate other upstream or downstream application servers invoked from or by the first server. Due to the complexity and interconnectivity of application server infrastructure, errors or failures in one node (or group of nodes) in the infrastructure can manifest as performance degradations or additional errors or failures in other nodes (or groups of nodes) at other locations in the infrastructure. Additionally or alternatively, errors in one node or a combination of nodes can manifest as failures or performance issues in the associated communication services, such as voice call failures, reduced network speeds in data sessions, message delivery failures, etc. Further, some performance degradations and failures may have a single root cause, while others may be caused by a combination of errors occurring in different nodes and/or clusters in the infrastructure. As a result, tasks such as detecting and predicting service degradations and determining root causes cannot be performed effectively using heuristics-based systems single-server analysis systems.

To address the deficiencies of existing systems in detecting and repairing service degradations and failures in wireless network infrastructures, the techniques described herein include using ML models trained based on the combination of application server output data (e.g., errors, failures, throughput, etc.) and the corresponding performance of the communication services provided by the network (e.g., voice, data, and messaging metrics). As described in more detail below, the ML models may be trained based on converged voice, data, messaging data, from a variety of UE devices, subscribers, networks, changing plans (e.g., prepaid and postpaid) and accounts, and the like. As a result, the trained ML models may perform predictive (rather than reactive) monitoring and detection of service degradation and anomalies, as well as providing an end-to-end service view, classification algorithms, and determining root causes for service degradations and outages.

In certain examples, the ML models described herein may be used on a charging system infrastructure of a wireless network. Such charging systems for large-scale networks may include hundreds of interconnected and overlapping application servers configured to provide various charging functionalities, for both prepaid and postpaid subscribers, and for voice, data, message, and/or 5G services. In such systems, some ML models may be trained to perform analyses (e.g., performance degradation analysis, anomaly detection, root cause analysis, etc.) on the charging system as a whole, while other ML models may be trained to perform service-specific analyses (e.g., analyses on voice service, data service, or messaging service, etc.). Additionally, some ML models may perform analyses on particular networks (e.g., 2G, 3G, 4G, or 5G), and some ML models may perform analyses on particular subscriber types, UE types, account types, and/or charging types (e.g., prepaid or postpaid), or any subsets or combinations thereof.

However, although some examples may relate specifically to charging system infrastructures, it can be understood from the context of this disclosure that the ML models described herein may be trained and executed to analyze performance and failures in other types of computer infrastructure environments.

In some examples, the ML models may be trained based on data from any number (or all) of the application servers (or nodes) in the charging system. The model training data from each charging node may include the request/response data from each node, including but not limited to the requests times, the upstream nodes from which the requests were received, the request parameters, the additional downstream nodes called by the node during execution, etc. Additionally or alternatively, the ML model training data may include, for each node, error data, failures, and/or performance data (e.g., execution time, throughput, latency, etc.). Additionally, in some cases, the ML models also may be trained based on the performance of the communication services (e.g., the voice, data, messaging, and 5G services). For example, the timing and types of service outages or failures may be used as training data, as well as the performance data for the services (e.g., request or session throughput, network speed/quality, latency, dropped calls/non-dropped calls, etc.).

Different ML techniques and/or training data sources may be used to train different ML models. For example, some ML models may be trained based solely on charging node data. These ML models may be used to detect or predict service degradations and/or anomalies, for example, based on changes in error patterns. Other ML models may be trained based on a combination of charging node data and service performance data and can also detect or predict service degradations and/or anomalies. Additionally, by training based on the combination of service data and charging node data, these ML models also may be configured to determine correlations that can identify the root causes of any detected or predicted service degradations or anomalies. For instance, a trained ML model may identify an anomaly within a first node and the same trained ML model (or a different model) may identify a different node or a combination of nodes as the cause of the anomaly.

To detect or predict service degradations, anomalies, and/or root causes, the ML models may receive as inputs error counts and/or other metrics from some or all of the nodes in the charging system. The ML models may be trained to analyze the patterns of the errors and/or other metrics, and to compare the observed error patterns against expected error patterns based on historical data. The outputs of the ML models may include binary indications of service degradations or anomalies (e.g., detected or not detected), predicted times or conditions associated with the degradations or anomalies, and/or nodes associated with the predicted degradations or anomalies (e.g., root cause nodes). Thus, the ML models and associated techniques described herein may provide improved predictive analyses of charging systems and/or other computing infrastructures associated with wireless networks. In particular, these techniques allow anomalies such as outages and service degradations within the communication network to be predicted in advance, rather than merely reacted to after the fact. Additionally, these techniques improve the robustness and accuracy of root cause determinations of such anomalies, which can identify the nodes and components (and/or combinations thereof) causing the anomalies rather than identifying the nodes or services at which the anomalies manifest.

FIG. 1 illustrates a network architecture 100 of an example wireless telecommunications network, including a machine learning system for detecting and repairing service degradations and outages within the telecommunications network. In this example, the network architecture 100 includes a machine learning system configured to train and execute ML models based on error data, performance data, and outages from a core wireless network and/or application servers the computing infrastructure of the telecommunications network.

The network architecture 100 shown in this example may support a number of user equipment devices (or UE devices), controlled by subscribers, to access the various communication services provided by the network architecture 100. UE devices may communicate with the wireless network via one or more access networks, including a 3G access network 102, a 4G/LTE access network 104, and a 5G access network 106. Additional or alternative types of access networks may be used in other examples (e.g., WiFi access networks, satellite-based access networks, etc.). Each access network can include any number of wireless network nodes, including entry nodes, access nodes, proxy servers, and the like, through which UE devices communicate with the core network 108. The core network 108 (or backbone network) of the wireless network provides the requested voice, data, and messaging services to the UE devices. The core network 108 includes network nodes such as routers and switches, and is configured to determine and deliver routes through various subnetworks and access networks to provide connections to UE devices.

The computing infrastructure 110 may include a number of application servers implemented on computers systems configured to provide features and functionality associated with the wireless network. For example, the computing infrastructure 110 can be implemented on a single computer server or cluster of computer servers (e.g., one or more datacenters), as software-based services and/or applications to perform authentication, security, charging, and tracking/monitoring of the communication services delivered via the core network 108 and access networks 102-106.

In some examples, the computing infrastructure 110 may include application servers be used to implement the charging system of the wireless network. As noted above, a charging system may include dozens or hundreds of interconnected nodes, each implemented as one or more applications or services, that collectively handle the authorization, charging/billing, and subscriber account management associated with communication services provided by the core network 108 and access networks 102-106. In this example, the charging system may include various nodes, each of which may be implemented as one application server (e.g., a process or service) or multiple application servers. For instance, the charging nodes of the charging system shown in this example include one or more account information and refill (AIR) system nodes 112, one or more charging control node (CCN) nodes 114, one or more online charging control (OCC) nodes 116, one or more service data point (SDP) nodes 118, one or more CTA/CSA nodes 120, and/or one or more multi mediation (MM) nodes 122.

The AIR system nodes 112 can include one or more services and/or applications configured to monitor and refill subscriber accounts. Individual nodes within the AIR system nodes 112 may perform calculations for determining and extending expiration data, and adding money to prepaid subscriber accounts. Additional AIR system nodes 112 also may provide information relating to subscriber accounts, handle account refills from various different sources via telephony or IP networks. Each AIR system node may be an autonomous system including specialized hardware and software, and multiple AIR system nodes can be deployed to provide redundancy and increase capacity. The AIR system nodes 112 can interact with (e.g., send requests, invoke functions, receive and handle requests, etc.) and interactive voice response (IVR) system, the SDP nodes 118, the OCC nodes 116, etc.

The CCN nodes 114 can include one or more services and/or applications configured to handle circuit-switched calls and data and messaging (e.g., SMS) over various messaging protocols. In particular, the CCN nodes 114 may implement the logic for the diameter service charging application to support content-based charging for services. For instance, various CCN nodes 114 may perform service authorization and rating, and may return information used for service-aware charging and control (e.g., real-time service charging). The CCN nodes 114 may convert incoming messages, analyze data for the charging system to determine chargeable sessions and events, and initiate operations of the SDP nodes 118 for updating subscriber accounts. Additional CCN nodes 114 may be configured to perform functions including call control, call session control, retrieve number portability information from a flexible number register (FNR), retrieve subscribe location information from a home location register (HLR), access messaging charging triggers, generation of call detail records, and the like. Additional examples of CCN nodes 114 in various charging systems may include nodes configured to generate and maintain listings of barred location numbers, visitor location registers, number normalization listings, number portability mappings, white list data, configuration data for SDP selection and/or call detail record (CDR) listings, listings of configuration data for number conversions (e.g., based on country codes, national or international prefixes, etc.), configuration data for call control, etc.

The OCC nodes 116 can include one or more services and/or applications configured to manage the subscriber data and/or determine compliance with the subscriber's charging restrictions (e.g., subscriber usage limitations, spending limits, balance of prepaid credit, plan features/limitations, etc.). For example, the OCC nodes 116 may receive and respond to requests to determine whether a requested service (e.g., a voice call, data session, or message) is permitted for the subscriber.

The SDP nodes 118 can include one or more services and/or applications configured to generate and manage data stores containing subscriber and account information. For example, various nodes within the SDP nodes 118 may determine ratings for calls and events, perform post-processing of call detail records (CDRs), initiate unstructured supplementary service data (USSD) and SMS notifications. Additional SDP nodes 118 may implement evaluation logic for the call control functionality performed by the other nodes in the charging system, and/or may trigger the setup of a USSD call-back. SDP nodes 118 also may store and manage subscriber-related and/or account-related data, including but not limited to service class data, announcement class data, usage accumulation data, tariff/charging analysis data, subscriber life-cycle data, account data and associated account data (e.g., family and friends accounts), USSD and SMS notification data, promotion plan data, HLR blocking data, community data, and/or segmentation data. In some examples, SDP nodes 118 may be implemented using any number of similar or identical server clusters.

The CTA/CSA nodes 120 can include one or more services and/or applications configured to preforming charging traffic aggregator (CTA) functionality and/or charging service aggregator (CSA) functionality within the computing infrastructure 110. For example, a CTA node 120 may be used during communication between OCC/CCN and SDP nodes, and/or between SDP nodes and other SDP nodes. For instance, any or all diameter communications within a charging system may be performed through a CTA node. A CTA node may be used to simplify the network, moving away from a mesh network, and may act as a proxy function in the communication network. For example, a CTA node may receive a message (e.g., from OCC) and replace the origin and destination realm of the message, and send the packet to the target destination. Additionally or alternatively, CSA nodes may be used in charging functions to address the architecture challenges and simplify the network. A CSA node may provide a single cluster view of a charging function towards external 5G Core external network functions (e.g., SMF's, PCF's, NRF's, etc.). The CSA node may simplify the charging function failure and overload handling logic from the external network functions. In some cases, CSA nodes may require less (or zero) external integration during introduction of new OCC members and/or new pool of OCC members. A CSA node also may auto-balance the incoming traffic from SMF/PCF based on node and/or pool capacities. Additionally, a CSA node may provide seamless transition support from a current architecture to the introduction of a new charging access function (CAF).

The MM nodes 122 can include one or more services and/or applications configured to perform mediation functionality within the computing infrastructure 110. In some examples, MM nodes 122 may be implemented as Ericsson Multi Mediation (EMM) nodes. For instance, MM nodes 122 may perform end-to-end, convergent mediation solutions with real time and/or file-based mediation capabilities for all services generated from all networks within the computing infrastructure 110. The MM nodes 122 can collect data from multiple sources in multiple formats, process data as per the needs and requirements of the operation, and distribute the processed data to a desired system in BSS and/or OSS. In some examples, MM nodes 122 may be used to institute policies to prevent harmful behaviors by third-party applications, which may include blocking certain UE devices from accessing the wireless network resources until the devices are in compliance with the policies. For instance, examples of MM nodes 122 may include nodes configured to restrict the user of applications UE devices, require subscribers to upgrade to a compliance operating system and/or software application versions or patches for usage of communication services, restrict UE device settings through over-the-air (OTA) profiles, restrict the user of certain device hardware features (e.g., camera, USB, Bluetooth, etc.) for using communication services, controlling use of WiFi, hot spots, and other network security settings on UE devices, enabling/disabling content sharing with specific mobile apps, etc.

Although several examples are described above of potential types of nodes in a charging system or other computing infrastructure associated with a wireless network, it can be understood that any combination of these application server nodes may be deployed in particular implementations of the computing infrastructure 110. Further, it can be understood from the context of this disclosure that the computing infrastructure 110 may correspond to a charging system or to other computing infrastructure used by a wireless network to provide communication services. The application server nodes in the computing infrastructure 110 may be implemented using any number of different computing architectures, and can be configured to execute as a programming stack of interdependent nodes that can perform the necessary functionalities of the computing infrastructure.

As shown in this example, an ML system 124 may receive data from the various application server nodes of the computing infrastructure 110. In some examples, any or all of the application server nodes (e.g., nodes 112-122) within the computing infrastructure 110 may include an ML agent process executing on the node. ML agents executing on application server nodes may be configured to monitor the operation of the node, and to determine associated node data (e.g., requests, performance metrics, errors, etc.) from application logs or OS metrics/logs. The ML agents may periodically transmit and/or continuously stream the application server node metrics from each node to the ML system 124, where it may be used as training data and/or input to trained ML models. Additionally, as described below, the ML system 124 may receive input data from the core network 108, including request or session metrics, performance data, outages, anomalies, etc., associated with the communication services supported by the wireless network.

Figure 2:
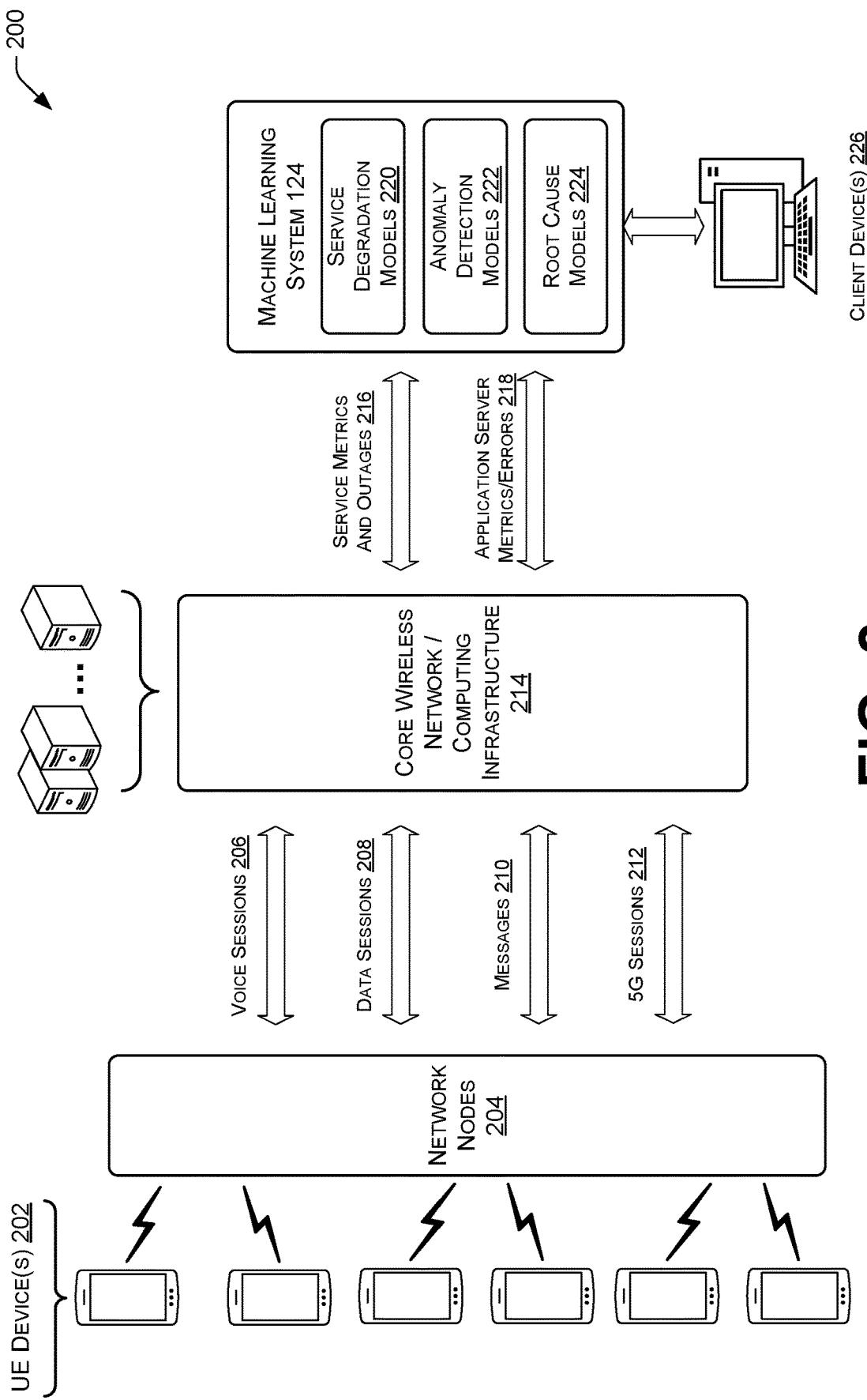
FIG. 2 is a block diagram illustrating an example telecommunications system used in one or more implementations of the disclosure.

FIG. 2 illustrates an example telecommunications network 200 used in one or more implementations described herein. The telecommunications network 200 may be similar or identical to the network architecture 100 of the wireless telecommunications network described above. As in the above example, the telecommunications network 200 includes an ML system 124 configured to detect and repair service degradations and outages within the wireless network, based on data received from nodes within the network and/or access networks (e.g., network nodes) and/or based on data from application server nodes within the computing infrastructure of the wireless network.

As noted above, "user equipment" or "UE" devices 202 may include communication devices, such as cellular telephone or other mobile terminal device, configured to communicate with a network nodes 204 within the telecommunications network 200 (e.g., a wireless network). UE devices 202, which also may be referred to as subscriber devices, can include wireless or wired voice- or data-communication devices. A UE device 202 may include a user interface (e.g., as does a smartphone), but is not required to. For example, a UE device 202 may include a streaming server configured to provide audio or visual content on demand. Such UE devices 202 need not include user interfaces, and may instead respond to other UE devices 202 that form queries and send those queries to the server in response to actions taken via interfaces at those other UE devices. In various examples, UE devices 202 can be, for instance, cellular phones, smartphones, tablet or laptop computers, personal digital assistants (PDA), smartwatches or other wearable computing devices, personal computers (PCs) or desktop workstations, servers, media centers, vehicle-based computing devices, and the like. UE devices 202 may be configured to initiate communication sessions via the wireless network, or to receive and respond to communication session requests. Subscribers may control UE devices 202 to initiate and perform voice communication sessions, data sessions, and/or to send and receive messages. In various examples, the wireless network may identify and communicate with a UE device 202 using a unique identifier. As used herein, a "unique identifier" and similar terms may include both truly unique identifiers (e.g., Ethernet MAC addresses that are unique by construction, or Version 1 UUIDs) and/or identifiers with a negligible probability of collision (or non-uniqueness) such as SHA256 hashes of data uniquely identifying an object, or Version 4 UUIDs.

The terms "session" and "communication session" as used herein may refer to a communications path for bidirectional exchange of data among two or more computing devices. For example, communications sessions may refer to voice and/or data sessions between multiple UE devices 202 that take place over the wireless network, and/or to sessions between a UE device 202 and network node 204 of a wireless network (e.g., an entry node, proxy server, application server, etc.). Examples of sessions may include, but are not limited to, voice and video calls by which human beings may converse, data communication sessions between two electronic systems or between an electronic system and a human being, and/or a Rich Communication Suite (RCS, also known as JOYN) sessions, and the like. Sessions can be carried (or provided) by cellular or data networks, including but not limited to LTE or Institute of Electrical and Electronics Engineers (IEEE) 802.11 (WIFI). Other examples of networks that may carry communication sessions are discussed below.

As shown in this example, UE devices 202 may communicate with the network via network nodes 204. Network nodes 204 may represent entry nodes (e.g., cell sites) of an access network, by which the UE devices 202 may initiate or receive communication sessions with other devices over the telecommunications network 200. In various examples, each network node 204 may correspond to a cell site, or a particular sector within a multi-sector cell site. Additionally or alternatively, a network node 204 may be associated with a particular radio access technology and/or frequency band (e.g., mid-band, low-band, etc.). In some examples, multiple network nodes 204 may be implemented within the same cell site (and/or may be associated with the same sector), wherein each network node 204 may represent a different frequency layer provided at the cell site and/or sector.

Subscribers operating UE devices 202 may initiate and provide communication sessions through the various communication services supported by the network. For example, the UE devices 202 may transmit requests to other devices and/or receive requests from other devices, via the network, to perform voice sessions 206, perform data sessions 208, send or receive messages 210, and/or perform 5G sessions 212. Requests initiated at UE devices 202 may be transmitted through one or more network nodes 204, to the core wireless network and computing infrastructure 214. The core wireless network and computing infrastructure 214 may include the components of the core network 108 and the computing infrastructure 110 described above. As described above, the core wireless network and computing infrastructure 214 may include the network components to handle requests, establish connections, and provide communication services (e.g., voice, data, and messaging services) to UE devices 202. Additionally, the core wireless network and computing infrastructure 214 may include the applications servers (e.g., application server nodes implemented as services, applications, etc.) to authorize requests, track communication sessions, charge accounts, etc.

As shown in this example, an application server node within the core wireless network and computing infrastructure 214 (e.g., an AIR system node 112, a CCN node 114, an OCC node 116, an SDP node 118, a CTA/CSA node 120, an MM node 122, etc.) may be used to handle requests associated with any number of different UE devices 202, network nodes 204, network types/technologies (e.g., 3G, LTE, 5G, etc.), and/or communication services (e.g., voice, data, or messaging). In some cases, a particular application server node may be invoked, once or multiple times, for all requests associated with any UE devices 202, network nodes 204, network types/technologies, or communication services, while a different application server node may be invoked only for requests associated with particular subsets of UE devices 202, network nodes 204, network types/technologies, or communication services, or any combinations thereof. When an application server node is invoked (e.g., based on a call from another node), the application server node may or may not have information about the initial subscriber request or communication session that caused the invocation. For instance, the parameters of a call to an application server node may be analyzed to determine that call is associated with a particular service, particular network node, particular telecommunications technology, etc. In other instances, calls to application server nodes may be similar or identical (e.g., similar parameters, similar timing and patterns of requests, etc.) for different services, network types, and the like.

As shown in this example, the core wireless network and computing infrastructure 214 may provide data to the ML system 124, relating to the requests received and handled by the application server nodes and the communication services provided by the telecommunications network 200. As noted above, data provided to the ML system 124 may include communication service data provided by the core network and/or access network (e.g., network node metrics) and/or changing system or computing infrastructure data provided by the application server nodes. In this example, the ML system 124 may receive data 216 including service metrics and/or outages from the network and/or application server nodes associated with the various communication services. For instance, data 216 may include data related to service outages, service performance data (e.g., request throughput and metrics, session speed, quality, latency, etc.) from the various communication services (e.g., voice, data, messaging, and 5G). Additionally or alternatively, the ML system 124 may receive data 218 including application server metrics and/or errors from the application server nodes of the computing infrastructure. For instance, data 218 may include error data (e.g., numbers of errors, error codes, etc.) and/or performance metrics (e.g., number of requests handled, request parameters and/or metadata, etc.) associated with any or all of the application server nodes in the computing infrastructure.

The ML system 124 may use data received from the core wireless network and computing infrastructure 214 (e.g., data 216 including service metrics outages and data 218 including application server node errors and performance metrics) to train and execute various ML models. As shown in this example, the ML system 124 may train and execute instances of service degradation models 220 configured to detect and predict performance degradations associated with the communication services, anomaly detection models 222 configured to detect operational anomalies within the network components and/or computing infrastructure of the network, and/or root cause models 224 configured to determine the root causes associated with service degradations and/or anomalies.

As described below in more detail, the ML system 124 may include components to generate outputs and perform actions within the wireless network based on the results of the ML models. In some examples, the ML system 124 may generate end-to-end service dashboards based on the outputs of the ML models. The ML system 124 also may be configured to transmit notifications based on the detection or prediction of a service degradation or anomaly. Service dashboards and/or notifications may be output to one or more client devices 226, which may include devices associated with subscribers and/or devices associated with network administrators, etc. Additionally or alternatively, the ML system 124 may be configured to execute various automated processes on the servers and systems within the core wireless network and computing infrastructure 214, based on the outputs of the ML models. Examples of automated processes, described below in more detail, may include processes for automatically repairing the root causes and/or mitigating the effects of any detected service degradations or anomalies.

Figure 3:
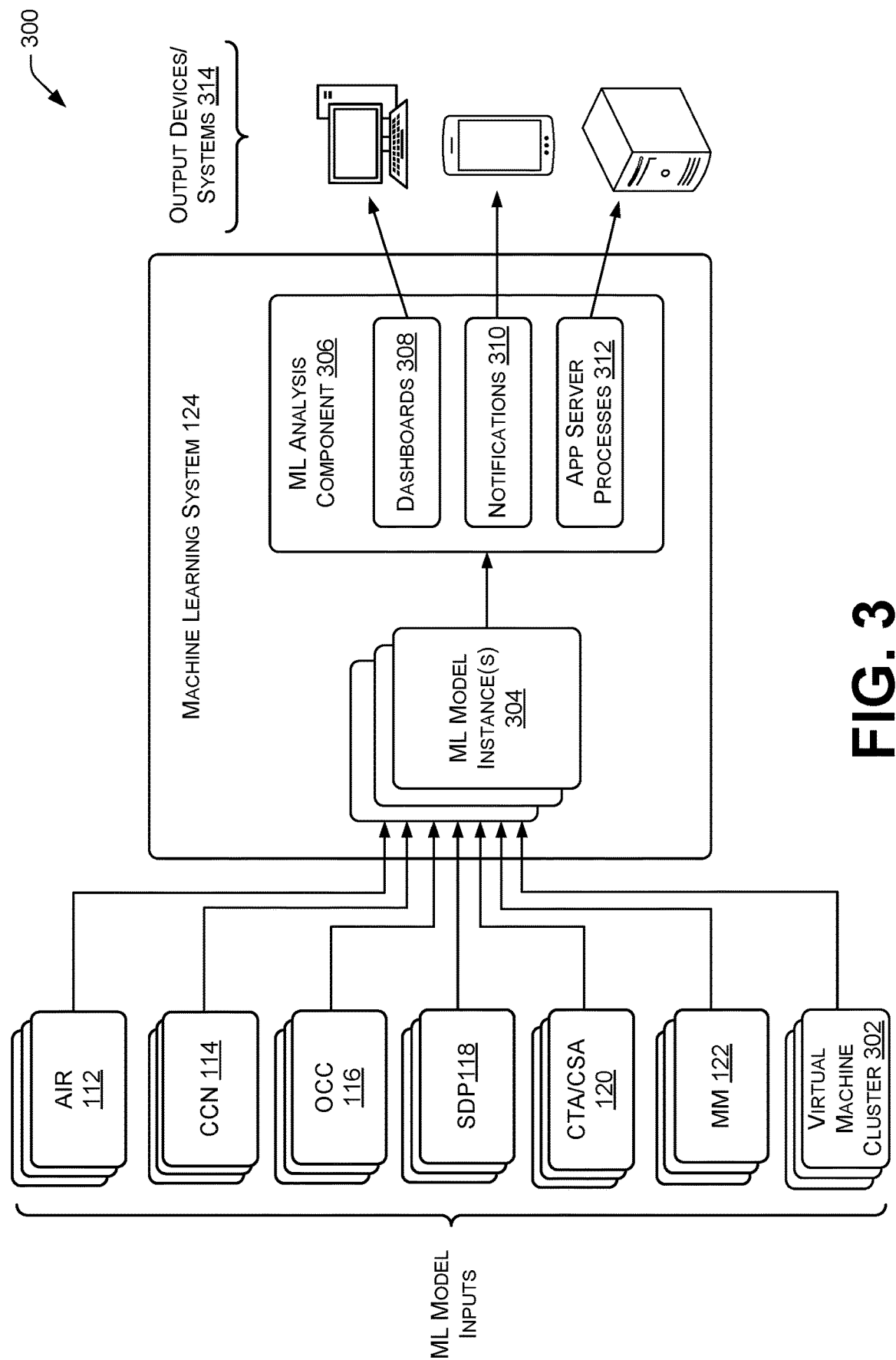
FIG. 3 is a block diagram illustrating an example system including machine learning model instances trained to detect and predict service degradations and anomalies based on input data from application servers of a charging system, in accordance with one or more implementations of the disclosure.

FIG. 3 depicts an example computing system 300 including components of an ML system 124, services and/or application server nodes providing model input data, and output devices that may receive outputs from the machine learning system based on the execution of ML models. In some examples, the components within the computing system 300 may be similar or identical to the components described in the network architecture 100 and/or the telecommunications network 200. For instance, the ML system 124 may be configured to train and store any number of different ML models, and to execute ML model instances 304 based on the trained models. Additionally, an ML system 124 may include an ML analysis component 306, which may be configured to instantiate and execute the ML models, receive and analyze the results of the ML models, and/or to perform actions based on the results of the ML models.

As noted above, the ML system may implement various types of ML models to detect or predict service degradations and/or anomalies within the wireless network. The ML models may receive as input data any combination of data from the core wireless network (e.g., network node data) and the computing infrastructure (e.g., application server nodes) of the wireless network. As shown in this example, the ML model input data may include received from various application server nodes, including (but not limited to) AIR system nodes 112, CCN nodes 114, OCC nodes 116, SDP nodes 118, CTA/CSA nodes 120, and/or MM nodes 122. Additionally, the ML model input data may include data from one or more virtual machine (VM) clusters 302 running the core wireless network and/or the computing infrastructure of the wireless network.

One or more virtual machine (VM) clusters 302 may make use of VMs as nodes. In some examples, a VM cluster 302 may be used to install multiple functionalities on the same server, thereby enhancing the server utilization. VM clusters 302 may be utilized to protect the physical machines from hardware and/or software failures. For instance, when a physical node fails in the computing infrastructure 110, a VM can access another node with little or no time lag. VM clustering therefore provides a dynamic backup process.

The ML system 124 in this example includes a number of ML model instances 304 and an ML analysis component 306. The ML model instances 304 may include multiple instances of the same ML model and/or instances of different ML models configured to receive different input data sets and provide different predictive outputs associated with the telecommunications network. Certain ML model instances 304 may be configured to detect or predict service degradations or anomalies associated with the wireless network as a whole. Other ML model instances 304 may be configured to detect or predict service degradations or anomalies associated with particular communication services (e.g., voice, data, or messaging), particular cellular technologies (e.g., 3G service, 4G/LTE service, 5G service, etc.), particular regions or subnetworks, etc.

The ML analysis component 306 may be configured to receive and analyze the outputs of the ML model instances 304, and to perform various actions based on the results of the ML model instances 304. In some cases, the ML analysis component 306 may perform one or more actions based on an output from a single ML model instance 304. In other cases, the ML analysis component 306 may perform actions based on the outputs from multiple ML model instances 304 and/or may aggregate the results from multiple ML model instances 304. The ML analysis component 306 also may analyze the results of the ML model instances 304 over time to detect patterns, determine trend analyses, and the like. In some instances, the ML analysis component 306 can initiate new ML model instances 304 based on the results of existing ML model instances 304. For example, a new ML model instance 304 configured to perform a root cause analysis may be initiated based on an existing ML model instance 304 that outputs a predicted anomaly within the wireless network.

The ML analysis component 306 can be configured to perform any number of actions based on the outputs of the ML model instances 304. In this example, the ML analysis component 306 includes a dashboards component 308, a notifications component 310, and an application server processes component 312. The dashboards component 308 may be configured to generate end-to-end service dashboards, such as a voice service dashboard, data service dashboard, messaging dashboard, etc., and output the service dashboards in response to requests from output device(s) 314. In some cases, the dashboards component 308 also may output technology-specific dashboards (e.g., a 3G service dashboard, 4G/LTE service dashboard, and a 5G service dashboard, etc.). As described below in more examples, the ML models in the various service dashboards may be used to provide the health of the service as a whole, which may include the call (e.g., voice, data, and/or SMS) to move from the various network elements to be successful. Any number of different combinations of key performance indicators (KPIs) may be used as input data from the network elements described herein to train the machine learning models and/or predict or detect anomalies in the service.

The notifications component 310 may be configured to generate and transmit notifications based on particular outputs of the ML model instances 304. For instance, the notifications component 310 can compare the outputs of the ML model instances 304 to one or more thresholds, and may generate and transmit notifications based on the ML model outputs meeting or exceeding the thresholds. Based on particular outputs of the ML model instances 304, the notifications component 310 may determine specific recipients (e.g., network administrators) and/or recipient devices (e.g., output device(s) 314) to receive specific notifications. Notifications also may include specific data based on the outputs of the ML model instances 304, such as data identifying the type of alert (e.g., a service degradation or anomaly), the affected services, systems, or networks, the predicted failure times or systems of the service degradation or anomaly, the root cause servers of the service degradation or anomaly, suggested repairs to be performed on the affected servers, etc.

The application server processes component 312 may be configured to execute specific processes, for example, to repair one more servers or systems (e.g., application server nodes), to repair or further diagnose a service degradation or anomaly, and/or mitigate the effects of a service degradation or anomaly determined by the ML model instances 304. A process initiated by the application server processes component 312 may execute on any of the nodes within the core network and/or access networks (e.g., network nodes), and/or on any application server nodes within the computing infrastructure of the wireless network.

Any number of different types of repair processes, diagnostic processes, optimization processes, and/or mitigation processes may be performed by the application server processes component 312, based on the outputs of the ML model instances 304. For example, the application server processes component 312 may restart one or more software processes on the application server nodes that are used in providing communication services and/or infrastructure services (e.g., request authorization, charging, account management, etc.) to the wireless network subscribers. In other examples, the application server processes component 312 may initiate a process to close other open applications on one or more of the application server nodes in order to free up RAM on those nodes. Such a process may access the OS tools of an application server node to identify the amounts of computing resources (e.g., compute, RAM, bandwidth, etc.) being used by various applications, and may determine which applications to close (e.g., by ending processes) based on the resource usage data. Rather than restarting a software component, in some cases, the application server processes component 312 may automatically uninstall and reinstall particular software applications on the application server node. In still other examples, the application server processes component 312 may initiate a process to restart one or more of the application server nodes and/or network nodes within the wireless network. Rebooting the root cause nodes and/or restarting the relevant applications on these nodes may resolve certain service degradation issues and/or anomalies detected by the ML model instances 304.

In some cases, the application server processes component 312 may initiate one or more diagnostic processes configured to determine a root cause, affected nodes, and/or repair recommendations for the service degradation issues and/or anomalies detected by the ML model instances 304. Examples of diagnostic processes may include processes using heuristics to determine potential causes of anomalies based on the types of the application server nodes affected, software programs and versions running on the nodes, the error codes observed on the nodes, etc. Another example of a process performed by the application server processes component 312 may include an automated process to undo recent hardware and/or software changes on the application server nodes affected by and/or identified as the root cause a service degradation or anomaly. For instance, a component of recently installed hardware or software may conflict with a previously existing hardware or software component on the same node, causing the service degradation or anomaly. Additional processes performed by the application server processes component 312 may include processes to automatically change the security and/or computer settings on an application server node.

In still other examples, the application server processes component 312 may initiate a process to look-up and/or retrieve a software a software patch to apply to an application server node that may update the node and repair or mitigate the service degradation or anomaly. Additional examples of processed performed by the application server processes component 312 may include, after determining the particular application server nodes determined by the ML model instances 304, scanning the particular application server nodes for viruses and/or malware, checking the particular application server nodes for a firewall software conflict, rebooting the particular application server nodes in safe mode, and/or defragmenting the hard drive on the particular application server nodes.

Figure 4:
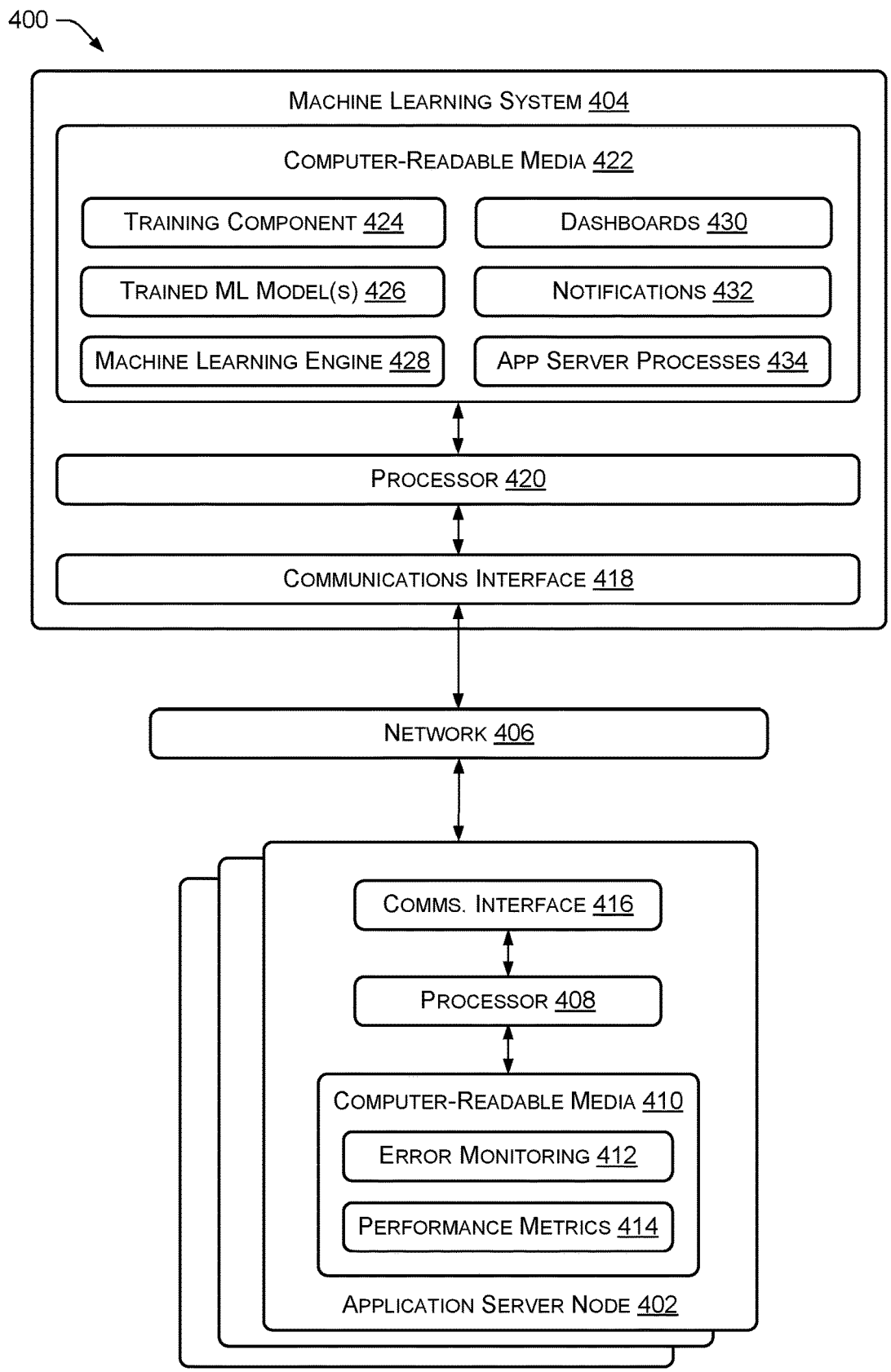
FIG. 4 is a block diagram illustrating components of an example application server and a machine learning system used in one or more implementations of the disclosure.

FIG. 4 is a block diagram illustrating an example computing environment 400 on which various techniques described herein may be implemented. For instance, the computing environment 400 may be configured to determine service degradations and/or anomalies within a telecommunications network, using metrics and/or error data from one or more application server nodes, and then to perform particular actions based on the service degradations or anomalies. The computing environment 400 includes an application server node 402 communicatively connectable with an ML system 404 via a network 406. The ML system 404 may be similar or identical to the ML system 124 described above. As described above, the ML system 404 may be associated with a telecommunications network and may be configured to train and execute ML models to detect or predict operational issues (e.g., service degradation or anomalies) within the telecommunications network. The ML system 404 may be implemented using dedicated or shared computing hardware, within a cloud-based computing environment and/or within an on-premise computing infrastructure (e.g., a data center of a telecommunications network provider). The network 406 can include one or more networks, including an IP-based computer network, or a cellular or non-cellular network. Example network technologies are described above with reference to FIGS. 1-3. In some examples, a SAS, Domain Proxy, CBSD, base stations, access point, or terminal can include one or more components shown in FIG. 4, and can connect to one or more wired or wireless networks.

Although one application server node 402 is shown in this example, in other examples any number of application server nodes may operate within a telecommunications network and may communicate with an ML system 404. For example, the application server node 402 may correspond to any of the types or instances of application server nodes described above in FIGS. 1-3 (e.g., AIR system nodes 112, CCN nodes 114, OCC nodes 116, SDP nodes 118, CTA/CSA nodes 120, and/or MM nodes 122). The application server node 402 can include one or more processors 408, e.g., one or more processor devices such as microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processors (DSPs). The application server node 402 can include one or more computer readable media (CRM) 410, such as semiconductor memory (e.g., RAM, read-only memory (ROM), solid state drives (SSDs), or the like), disk drives (e.g., platter-based hard drives), another class of computer-readable media, or any combination thereof. The computer readable media 410 may store one or more software components of the application server node 402, including an error monitoring component 412 configured to provide error data associated with the application server node 402 to the ML system 404, and a performance metrics component 414 configured to provide performance data associated with the application server node 402 to the ML system 404. In some examples, the error monitoring component 412 and/or the performance metrics component 414 may include ML agent processes. The application server node 402 can further include one or more communications interface(s) 416, e.g., radio(s) or other network interface(s), configured to selectively communicate (wired or wirelessly) via the network 406.

CRM 410 can be used to store data and to store instructions that are executable by the processors 408 to perform various functions as described herein. In addition to the error monitoring component 412 and/or the performance metrics component 414, the CRM 410 can store various classes of instructions and data, such as an operating system, device drivers, program modules, etc. The processor-executable instructions can be executed by the processors 408 to perform the various functions described herein. CRM 410 may be or may include computer-readable storage media. Computer-readable storage media include, but are not limited to, registers, floppy disks, hard disks, SSDs, bar codes, Compact Discs (e.g., CD-ROM), digital versatile disks (DVDs), other optical storage, ROM, erasable programmable read-only memories (EPROM, EEPROM, or Flash), random-access memories (RAMs), other semiconductor memory technology, magnetic cassettes, magnetic tape, magnetic disk storage or other magnetic storage devices, or any other tangible, non-transitory medium which can be used to store the desired information and which can be accessed by the processors 408. In some examples, CRM 410 can include a non-volatile memory in a Subscriber Identity Module (SIM) card.

CRM 410 also can include processor-executable instructions of one or more applications providing functionality associated with the wireless network, including but not limited to communication service operations, charging system operations, and/or other computing infrastructure functionality associated with the telecommunications network.

In some examples, ML system 404 can communicate with (e.g., is communicatively connectable with) application server node 402 or other nodes or devices via network 406 using one or more communications interface(s) 418, e.g., network transceivers for wired or wireless networks, or memory interfaces. Example communications interface(s) 418 can include Ethernet or FIBRE CHANNEL transceivers, WIFI radios, or DDR memory-bus controllers (e.g., for DMA transfers to a network card installed in a physical server). Communications interface(s) 416 and 418 can include any of the components described herein.

The ML system 404 can include one or more processors 420 and one or more computer-readable media (CRM) 422.

CRM 422 may store processor-executable instructions including one or more ML training component(s) 424, one or more trained machine-learned models 426, an ML execution engine 428. As described above with reference to FIGS. 1-3, the ML training component(s) 424 may be configured to receive ground truth data from application server nodes 402, including application server metrics and/or error data, and to train ML models 426, based on ground truth data, to output handover parameters. The ML execution engine 428 may be configured to deploy and execute the trained ML models 426, and receive outputs from the trained ML models 426 (e.g., detected or predicted service degradations or anomalies). The CRM 422 also may store a dashboard component 430, a notifications component 432, and an application server processes component 434. The dashboard component 430, notifications component 432, and application server processes component 434, may be similar or identical to the dashboard component 308, notifications component 310, and application server processes component 312 described above in FIG. 3.

The processor-executable instructions of components 424-434 can be executed by the one or more processors 420 to perform various functions described herein. In some examples, ML system 404 can be configured to, e.g., by executing the processor-executable instructions, perform functions described herein with reference to FIGS. 1-3 and 5-7, e.g., receiving error data and/or performance metrics from application server nodes, training ML models based on a combination of data from the application server nodes and performance metrics associated with communication services (e.g., voice, data, and messaging), and determining service degradations, anomalies, and/or root causes of such issues within the telecommunications network. In some examples, the ML system 404 and/or application server nodes 402 also may include or may be communicatively connected with a user interface or similar subsystem. For example, the ML system 404 can transmit a web browser-based or application-based user interface to client device(s) 226, to allow users (e.g., network administrators) to define new ML models, train and execute the ML models, register for notifications to output devices, view end-to-end service dashboards, etc.

In some examples, processor 408 and, if required, CRM 410, are referred to for brevity herein as a "control unit." For example, a control unit can include a CPU or DSP and instructions executable by that CPU or DSP to cause that CPU or DSP to perform functions described herein. Additionally or alternatively, a control unit can include an ASIC, FPGA, or other logic device(s) wired (physically or via blown fuses or logic-cell configuration data) to perform functions described herein. Other examples of control units can include processor 420 with, if required, CRM 422.

Figure 5:
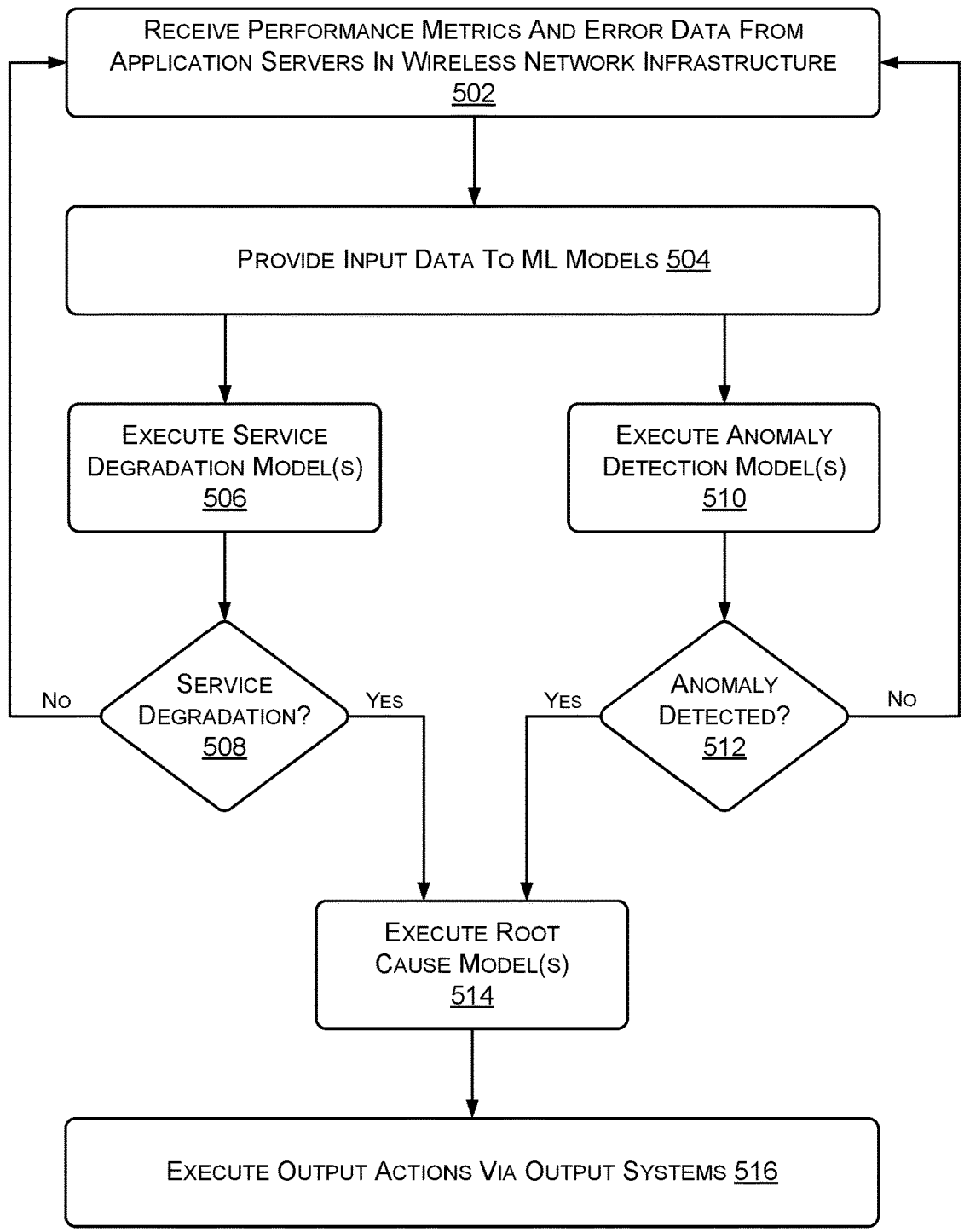
FIG. 5 illustrates an example process for executing ML models to detect and/or repair service degradations and anomalies within a wireless network, in accordance with one or more implementations of the disclosure.

FIG. 5 is a flow diagram illustrating an example process 500 for executing one or more ML models based at least in part on data from application server nodes, and analyzing the outputs of the ML models to detect or repair a service degradation and/or an anomaly within a telecommunications network. As described below in more detail, the operations of process 500 can be performed, for example, by a machine learning system 124 associated with a telecommunication network, based on data received from one or more application server nodes configured to implement the charging system or other computing infrastructure of the network. In some examples, machine learning system 124 may be implemented on one or more server(s), and may include control unit(s) configured to perform the various operations described below. The operations described in connection with process 500 may be performed, for instance, in response to computer program instructions triggering the process, which may be triggered periodically based on a schedule, or in response to additional training data received from one or more application server nodes, or may be triggered by a network operator or administrator.

The operations shown in FIG. 5, described below, can be performed in any order except when otherwise specified, or when data from an earlier step is used in a later step. For clarity of explanation, reference is herein made to various components shown in FIGS. 1-3 that can carry out or participate in the steps of the exemplary methods, and to various operations and messages that can occur while the exemplary method is carried out or as part of the exemplary method. It should be noted, however, that other components can be used; that is, exemplary method(s) shown in FIG. 5 are not limited to being carried out by the identified components, and are not limited to including the identified operations or messages.

At operation 502, an ML system 124 (e.g., server, computing device) may receive data from one or more application server nodes performing various operations of a computing infrastructure associated with a telecommunications network. In some cases, the application server nodes may include charging nodes configured to implement the functionality of the charging system of the wireless network, including receiving and handling authorization requests, managing subscriber plan/account data, monitoring communication sessions, and charging for communication services over voice, data, and messaging to the appropriate subscribers. As described above, the data received from the application server nodes in operation 502 may include error data and/or performance or operational metrics associated with any number of nodes within the core network and/or computing infrastructure of the network. The application server nodes may include, for example, AIR system nodes 112, CCN nodes 114, OCC nodes 116, SDP nodes 118, CTA/CSA nodes 120, and/or MM nodes 122. Additionally, as noted above, the application server nodes may be invoked to handle requests and provide functionality based on requests from subscribers for different communication service types (e.g., voice, data, messaging, and 5G), different cellular technologies or other access network types (e.g., 3G, 4G/LTE, 5G, WiFi, satellite, etc.), different regions or subnetworks within the wireless network, etc. Therefore, the data received by the ML system 124 in operation 502 may correspond to any number of different communication services, network types/technologies, etc.

At operation 504, the ML system 124 may determine input data one or more ML models based on the data received from the application server nodes in operation 502, and provide the input data to one or more ML model instances. As noted above, certain ML models may be designed and trained to receive input data from one or more application server nodes (e.g., performance metrics and error data patterns). For other ML models, the ML models may receive as input data a combination of data from the application server nodes, as well as operational data (e.g., performance data, outages, etc.) associated with the voice, data, messaging, and/or 5G communication services. A single ML model or multiple ML models may be retrieved and executed in operation 504. As described above, an individual ML model may be trained to determine issues (e.g., service degradation and/or anomalies) within the network as a whole, or within particular services, particular network types/technologies, and/or particular subscribers or subnetworks.

At operation 506, the ML system 124 may execute one or more specialized ML models configured to determine service degradation within the network. For instance, an ML model may be trained based on at least in part on the error data from the application server nodes of the computing infrastructure, to detect an existing service degradation or to predict a future service degradation. As described above, the ML models may compare the patterns of data (e.g., applications server node errors) to historical patterns in the training data. The ML models determining existing and/or predicted service degradations may determine such degradations for a particular communication service, access network, network technology, and/or subnetwork within the wireless network.

At operation 508, the ML system 124 may determine, based on the output of the service degradation ML model(s), whether a service degradation is detected or predicted for the network. The ML system 124 may use a number of predetermined threshold values, determined during or after the ML model training process, to classify the ML model input data as a service degradation being detected and/or predicted. For instance, ML system 124 may be configured with thresholds corresponding to a probability or confidence level of a service degradation occurring, and/or to a severity of the determined service degradation. As shown in this example, when a service degradation is not determined based on the output of the ML model (508:No), then process 500 may return to operation 502 to receive additional data from the application server nodes of the network.

At operation 510, the ML system 124 may determine, based on the output of the service degradation ML model(s), whether an anomaly is detected or predicted for the network. As described above, an anomaly may correspond to a divergence from an expected pattern (or expected patterns) of the data received from the application server nodes. For instance, a pattern and/or trend of particular types of error occurring on various application server nodes, that do not correspond to the expected error patterns based on the historical data used in the training process, may cause one or more ML models to output an anomaly, which may indicate a likelihood of an upcoming service outage or other failure within the network.

At operation 512, the ML system 124 may determine, based on the output of the anomaly detection ML model(s), whether an anomaly is detected or predicted within the network. As described above for operation 508, the ML system 124 may use predetermined threshold values, determined during or after the ML model training process, to classify whether or not an anomaly has occurred (or is predicted) within the network based on the model input data. The ML system 124 also may be configured with thresholds corresponding to a probability or confidence level of an anomaly, and/or to the severity of the determined anomaly. As shown in this example, when an anomaly is not detected based on the output of the ML model (512:No), then process 500 may return to operation 502 to receive additional data from the application server nodes of the network.

In various examples, the separate ML models executed and evaluated respectively in operations 506-508 (e.g., ML models to determine service degradations) and in operations 510-512 (e.g., e.g., ML models to determine service outages and other anomalies) can be combined or performed separately (e.g., using separate processes or threads). These ML models also can be performed concurrently or in sequence, or the ML models may be alternatives in which only one of the ML models is required. Various different thresholds may be used to detect different types or seventies of service degradations or anomalies, and/or for service degradations or anomalies associated with different communication services.

When one or both of service degradation is determined based on the output of the ML model (508:Yes), and/or an anomaly is determined based on the output of the ML model (512:Yes), then at operation 514 the ML system 124 may execute one or more additional ML models to determine a root cause associated with the determined service degradation and/or anomaly. In some examples, an ML model trained to determine a root cause of an issue in the wireless network may output a particular application server node, or a specific component within the application server node (e.g., a service, application, piece of hardware or software, etc.), that has been identified by the ML as the root cause of the service degradation or anomaly. In other examples, the ML model may output data identifying a combination of multiple application server nodes and/or components within application server nodes as the multiple root causes of the issue. Additionally, although in this example the ML model (s) to determine a root cause are performed separately from and after the ML models executed in operation 506 and operation 510, in other causes one or more root cause ML models may be performed in operation 506 and/or operation 510, either as separate models or integrated into the ML models configured to determine service degradations or anomalies.

At operation 516, the ML system 124 may perform one or more actions based on the outputs of the ML models executed in operation 506, operation 510, and/or operation 514. As described above, based on the detection (or prediction) of a service degradation and/or anomaly, the ML system 124 may be configured to generate and provide dashboard user interfaces and/or to transmit notifications to one or more client devices. Additionally or alternatively, the ML system 124 may initiate one or more automated processes on the servers and systems within the core wireless network and computing infrastructure in operation 514, including any combination of the automated processes described herein to repair, diagnose, optimization, and/or mitigate the determined service degradation and/or anomaly.

Although in this example the ML system 124 may perform an action only when a service degradation and/or anomaly is detected or predicted, in other examples the ML system 124 may perform any of the actions described herein even when no service degradation and/or no anomaly is detected or predicted. For instance, client devices may register for status notifications regarding the performance and detected anomalies and outages of the wireless network that are not dependent on determining service degradations and/or anomalies. Additionally, the ML system 124 may generate and provide one or more end-to-end service dashboards (e.g., a voice service dashboard, data service dashboard, messaging dashboard, 5G dashboard, etc.) to client devices, regardless of whether or not service degradations and/or anomalies are detected.

Figure 6:
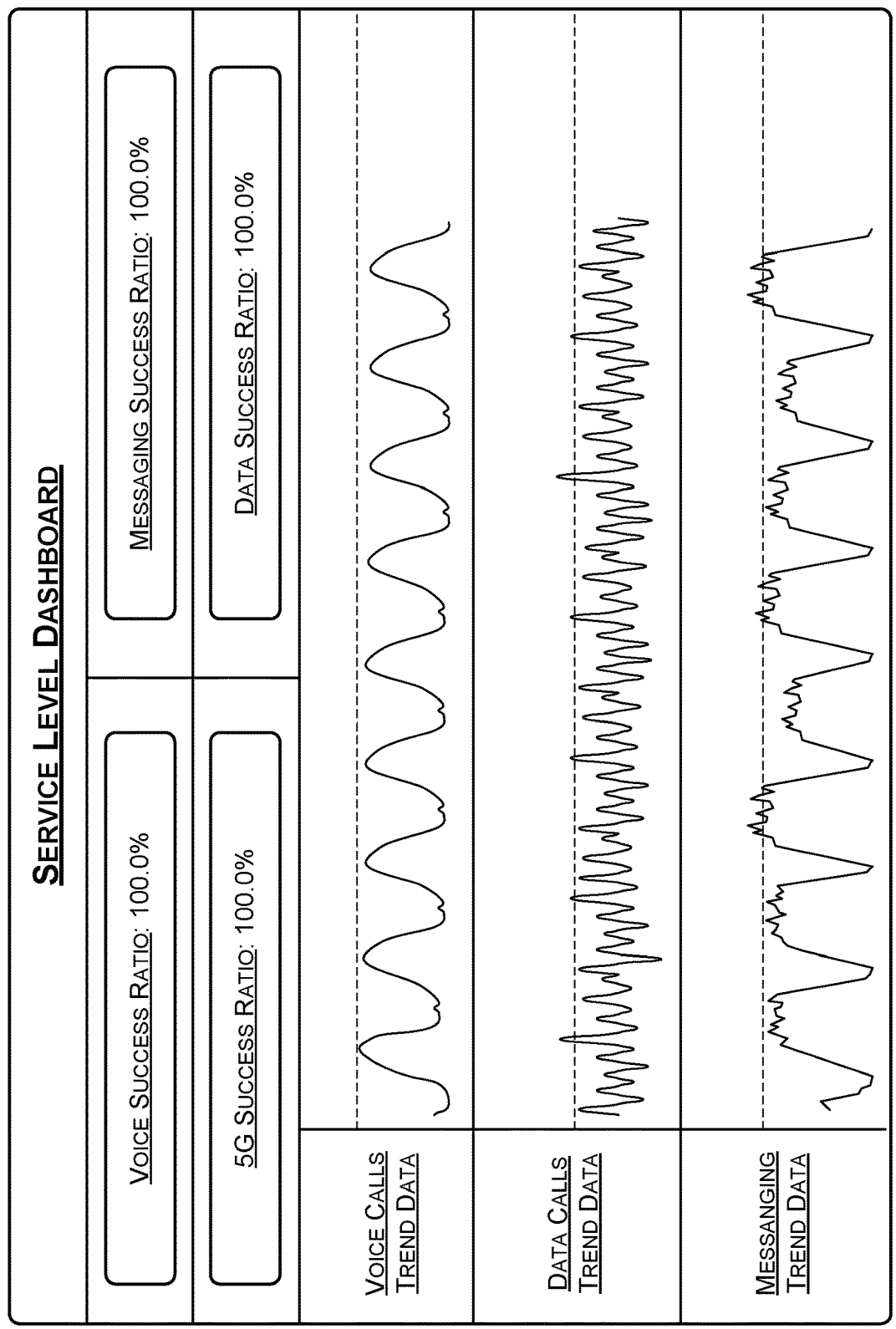
FIG. 6 depicts a user interface representing a service level dashboard for a telecommunications network, in accordance with one or more implementations of the disclosure.

Referring now to FIGS. 6 and 7, two different user interface screens are shown depicting of an example end-to-end service dashboard for the telecommunications network. In this example, the user interface screen 600 and user interface screen 700 may be generated based on the output of the ML models similar or identical to the various ML models described above. In this example, user interface screen 600 includes the current real-time success ratios for charging nodes within a telecommunications network (or a subnetwork selected by the user), for voice communication sessions, data communication sessions, messages, and 5G service. The example user interface screen 600 also depicts weekly trend data for voice calls, data calls, and messaging. Each weekly trend data includes a line that may correspond to an upper limit threshold for communications, above which a notification may be generated or an automated action may be performed. User interface screen 700 shows related end-to-end status data associated with the charging nodes of the telecommunications network, including the numbers of requests, success rates, and errors for OCC nodes and SDP nodes, as well as requests, success rates, and errors for the diameter SY interface and diameter GY interface.

EXAMPLE CLAUSES

Various examples include one or more of, including any combination of any number of the following example features. Throughout these clauses, parenthetical remarks are for example and explanation, and are not limiting. Parenthetical remarks given in this Example Clauses section with respect to specific language apply to corresponding language throughout this section, unless otherwise indicated.

A. A computer-implemented method, comprising: receiving, by a computer system, a first server performance metric associated with a first application server of a wireless communication network, wherein the first server performance metric is associated with a plurality of network service requests processed by the wireless communication network; receiving, by the computer system, a second server performance metric associated with a second application server of the wireless communication network, wherein the second server performance metric is associated with the plurality of network service requests; providing, by the computer system, the first server performance metric and the second server performance metric as input to a machine learning model; determining, by the computer system, a third application server of the wireless communication network, based at least in part on an output of the machine learning model; and initiating, by the computer system, a network operations process associated with the third application server.

B. The computer-implemented method of paragraph A, wherein the plurality of network service requests includes: at least one voice communication session request provided by a voice service of the wireless communication network; at least one data session request provided by a data service of the wireless communication network; and at least one message request provided by a messaging service of the wireless communication network.

C. The computer-implemented method of paragraph A, wherein the first server performance metric and the second server performance metric each include at least one of: a number of server errors over a time duration; a server error rate over the time duration; or a server request success ratio over the time duration.

D. The computer-implemented method of paragraph A, wherein the output of the machine learning model includes data indicating a performance anomaly and a wireless communication service type associated with the performance anomaly.

E. The computer-implemented method of paragraph A, wherein the output of the machine learning model includes data indicating a time of a predicted further future failure associated with the third application server.

F. The computer-implemented method of paragraph A, wherein initiating the network operations process comprises: initiating execution of a diagnostic process on the third application server; and determining, based at least in part on the diagnostic process, a server repair process for the third application server.

G. The computer-implemented method of paragraph A, further comprising: determining, based at least in part on the output of the machine learning model, a performance degradation associated with the wireless communication network, wherein the performance degradation includes at least one of: a current operational performance degradation of the wireless communication network; or a predicted future operational performance degradation of the wireless communication network.

H. The computer-implemented method of paragraph A, wherein the first application server is configured to: receive a first application service request associated with a first network service request received by the wireless communication network; transmit, based at least in part on the first application service request, a second application service request to the third application server; receive, from the third application server, a response to the second application service request; and transmit a response to the first application service request, based at least in part on the response to the second application service request.

I. The computer-implemented method of paragraph A, wherein the third application server is configured to perform at least one of: authorizing network service requests within the wireless communication network; monitoring network communication sessions within the wireless communication network; or maintaining subscriber device data and associated network usage data within the wireless communication network.

J. A system comprising: one or more processors; and one or more non-transitory computer-readable media storing instructions that, when executed by the one or more processors, cause the one or more processors to perform operations comprising: receiving a first server performance metric associated with a first application server of a wireless communication network, wherein the first server performance metric is associated with a plurality of network service requests processed by the wireless communication network; receiving a second server performance metric associated with a second application server of the wireless communication network, wherein the second server performance metric is associated with the plurality of network service requests; providing the first server performance metric and the second server performance metric as input to a machine learning model; determining a third application server of the wireless communication network, based at least in part on an output of the machine learning model; and initiating a network operations process associated with the third application server.

K. The system of paragraph J, wherein the plurality of network service requests includes: at least one voice communication session request provided by a voice service of the wireless communication network; at least one data session request provided by a data service of the wireless communication network; and at least one message request provided by a messaging service of the wireless communication network.

L. The system of paragraph J, wherein the first server performance metric and the second server performance metric each include at least one of: a number of server errors over a time duration; a server error rate over the time duration; or a server request success ratio over the time duration.

M. The system of paragraph J, wherein the output of the machine learning model includes data indicating a performance anomaly and a wireless communication service type associated with the performance anomaly.

N. The system of paragraph J, wherein the output of the machine learning model includes data indicating a time of a predicted further future failure associated with the third application server.

O. The system of paragraph J, wherein initiating the network operations process comprises: initiating execution of a diagnostic process on the third application server; and determining, based at least in part on the diagnostic process, a server repair process for the third application server.

P. The system of paragraph J, the operations further comprising: determining, based at least in part on the output of the machine learning model, a performance degradation associated with the wireless communication network, wherein the performance degradation includes at least one of: a current operational performance degradation of the wireless communication network; or a predicted future operational performance degradation of the wireless communication network.

Q. The system of paragraph J, wherein the first application server is configured to: receive a first application service request associated with a first network service request received by the wireless communication network; transmit, based at least in part on the first application service request, a second application service request to the third application server; receive, from the third application server, a response to the second application service request; and transmit a response to the first application service request, based at least in part on the response to the second application service request.

R. The system of paragraph J, wherein the third application server is configured to perform at least one of: authorizing network service requests within the wireless communication network; monitoring network communication sessions within the wireless communication network; or maintaining subscriber device data and associated network usage data within the wireless communication network.

S. One or more non-transitory computer-readable media storing instructions executable by a processor, wherein the instructions, when executed, cause the processor to perform operations comprising: receiving a first server performance metric associated with a first application server of a wireless communication network, wherein the first server performance metric is associated with a plurality of network service requests processed by the wireless communication network; receiving a second server performance metric associated with a second application server of the wireless communication network, wherein the second server performance metric is associated with the plurality of network service requests; providing the first server performance metric and the second server performance metric as input to a machine learning model; determining a third application server of the wireless communication network, based at least in part on an output of the machine learning model; and initiating a network operations process associated with the third application server.

T. The one or more non-transitory computer-readable media of paragraph S, wherein initiating the network operations process comprises: initiating execution of a diagnostic process on the third application server; and determining, based at least in part on the diagnostic process, a server repair process for the third application server.

CONCLUSION

Many variations and modifications can be made to the above-described examples, the elements of which are to be understood as being among other acceptable examples. All such modifications and variations are intended to be included herein within the scope of this disclosure and protected by the claims. Moreover, this disclosure is inclusive of combinations of the aspects described herein. References to "a particular aspect" (or "embodiment" or "version") and the like refer to features that are present in at least one aspect. Separate references to "an aspect" (or "embodiment") or "particular aspects" or the like do not necessarily refer to the same aspect or aspects; however, such aspects are not mutually exclusive, unless so indicated or as are readily apparent to one of skill in the art. The use of singular or plural in referring to "method" or "methods" and the like is not limiting.

The methods, processes, or operations described above can be embodied in, and fully automated via, software code modules executed by one or more computers or processors. As used herein, the term "module" is intended to represent example divisions of the described operations (e.g., implemented in software or hardware) for purposes of discussion, and is not intended to represent any type of requirement or required method, manner or organization. Therefore, while various "modules" are discussed herein, their functionality and/or similar functionality can be arranged differently (e.g., combined into a smaller number of modules, broken into a larger number of modules, etc.). In some instances, the functionality and/or modules discussed herein may be implemented as part of a computer operating system (OS). In other instances, the functionality and/or modules may be implemented as part of a device driver, firmware, application, or other software subsystem.

Example computer-implemented operations described herein can additionally or alternatively be embodied in specialized computer hardware, e.g., FPGAs. For example, various aspects herein may take the form of an entirely hardware aspect, an entirely software aspect (including firmware, resident software, micro-code, etc.), or an aspect combining software and hardware aspects. These aspects can all generally be referred to herein as a "service," "circuit," "circuitry," "module," or "system."

The word "or" and the phrase "and/or" are used herein in an inclusive sense unless specifically stated otherwise. Accordingly, conjunctive language such as, but not limited to, at least one of the phrases "X, Y, or Z," "at least X, Y, or Z," "at least one of X, Y or Z," "one or more of X, Y, or Z," and/or any of those phrases with "and/or" substituted for "or," unless specifically stated otherwise, is to be understood as signifying that an item, term, etc. can be either X, or Y, or Z, or a combination of any elements thereof (e.g., a combination of XY, XZ, YZ, and/or XYZ). Any use herein of phrases such as "X, or Y, or both" or "X, or Y, or combinations thereof" is for clarity of explanation and does not imply that language such as "X or Y" excludes the possibility of both X and Y, unless such exclusion is expressly stated.

As used herein, language such as "one or more Xs" shall be considered synonymous with "at least one X" unless otherwise expressly specified. Any recitation of "one or more Xs" signifies that the described steps, operations, structures, or other features may, e.g., include, or be performed with respect to, exactly one X, or a plurality of Xs, in various examples, and that the described subject matter operates regardless of the number of Xs present, as long as that number is greater than or equal to one.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

In the claims, any reference to a group of items provided by a preceding claim clause is a reference to at least some of the items in the group of items, unless specifically stated otherwise. This document expressly envisions alternatives with respect to each and every one of the following claims individually, in any of which claims any such reference refers to each and every one of the items in the corresponding group of items. Furthermore, in the claims, unless otherwise explicitly specified, an operation described as being "based on" a recited item can be performed based on only that item, or based at least in part on that item. This document expressly envisions alternatives with respect to each and every one of the following claims individually, in any of which claims any "based on" language refers to the recited item(s), and no other(s). Additionally, in any claim using the "comprising" transitional phrase, a recitation of a specific number of components (e.g., "two Xs") is not limited to embodiments including exactly that number of those components, unless expressly specified (e.g., "exactly two Xs"). However, such a claim does describe both embodiments that include exactly the specified number of those components and embodiments that include at least the specified number of those components.

What is claimed is:

1. A computer-implemented method, comprising:
    receiving, by a computer system, a first server performance metric associated with a first charging system node of a wireless communication network, wherein the first server performance metric is associated with a plurality of network service requests processed by the wireless communication network;
    receiving, by the computer system, a second server performance metric associated with a second charging system node of the wireless communication network, wherein the second server performance metric is associated with the plurality of network service requests;
    providing, by the computer system, the first server performance metric and the second server performance metric as input to a machine learning model;
    determining, by the computer system, a third charging system node of the wireless communication network, based at least in part on an output of the machine learning model; and
    initiating, by the computer system, a network operations process associated with the third charging system node, wherein the third charging system node is configured to perform at least one of:
        authorizing network service requests within the wireless communication network; or
        maintaining subscriber device data and associated network usage data within the wireless communication network.

2. The computer-implemented method of claim 1, wherein the plurality of network service requests includes:
    at least one voice communication session request provided by a voice service of the wireless communication network;

at least one data session request provided by a data service of the wireless communication network; and at least one message request provided by a messaging service of the wireless communication network.

3. The computer-implemented method of claim 1, wherein the first server performance metric and the second server performance metric each include at least one of:
a number of server errors over a time duration;
a server error rate over the time duration; or
a server request success ratio over the time duration.

4. The computer-implemented method of claim 1, wherein the output of the machine learning model includes data indicating a performance anomaly and a wireless communication service type associated with the performance anomaly.

5. The computer-implemented method of claim 1, wherein the output of the machine learning model includes data indicating a time of a predicted further future failure associated with the third charging system node.

6. The computer-implemented method of claim 1, wherein initiating the network operations process comprises:
initiating execution of a diagnostic process on the third charging system node; and
determining, based at least in part on the diagnostic process, a server repair process for the third charging system node.

7. The computer-implemented method of claim 1, further comprising:
determining, based at least in part on the output of the machine learning model, a performance degradation associated with the wireless communication network, wherein the performance degradation includes at least one of:
a current operational performance degradation of the wireless communication network; or
a predicted future operational performance degradation of the wireless communication network.

8. The computer-implemented method of claim 1, wherein the first charging system node is configured to:
receive a first application service request associated with a first network service request received by the wireless communication network;
transmit, based at least in part on the first application service request, a second application service request to the third charging system node;
receive, from the third charging system node, a response to the second application service request; and
transmit a response to the first application service request, based at least in part on the response to the second application service request.

9. The computer-implemented method of claim 1, wherein at least one of the first charging system node, the second charging system node, or the third charging system node is an account information and refill (AIR) system node, a charging control node (CCN), a service data point (SDP) node, a multi mediation (MM) node, an online charging control (OCC) node, or a charging traffic aggregator (CTA)/charging service aggregator (CSA).

10. A system comprising:
one or more processors; and
one or more non-transitory computer-readable media storing instructions that, when executed by the one or more processors, cause the one or more processors to perform operations comprising:
receiving a first server performance metric associated with a first application server of a wireless communication network, wherein the first server performance metric is associated with a plurality of network service requests processed by the wireless communication network;
receiving a second server performance metric associated with a second application server of the wireless communication network, wherein the second server performance metric is associated with the plurality of network service requests;
providing the first server performance metric and the second server performance metric as input to a first machine learning model associated with service degradation and to a second machine learning model associated with anomaly detection or prediction;
determining a third application server of the wireless communication network, based at least in part on an output of the first machine learning model or the second machine learning model; and
initiating a network operations process associated with the third application server.

11. The system of claim 10, wherein the plurality of network service requests includes:
at least one voice communication session request provided by a voice service of the wireless communication network;
at least one data session request provided by a data service of the wireless communication network; and
at least one message request provided by a messaging service of the wireless communication network.

12. The system of claim 10, wherein the first server performance metric and the second server performance metric each include at least one of:
a number of server errors over a time duration;
a server error rate over the time duration; or
a server request success ratio over the time duration.

13. The system of claim 10, wherein the output of the second machine learning model includes data indicating a performance anomaly and a wireless communication service type associated with the performance anomaly.

14. The system of claim 10, wherein the output of the first machine learning model or the second machine learning model includes data indicating a time of a predicted further future failure associated with the third application server.

15. The system of claim 10, wherein initiating the network operations process comprises:
initiating execution of a diagnostic process on the third application server; and
determining, based at least in part on the diagnostic process, a server repair process for the third application server.

16. The system of claim 10, the operations further comprising:
determining, based at least in part on the output of the first machine learning model, a performance degradation associated with the wireless communication network, wherein the performance degradation includes at least one of:
a current operational performance degradation of the wireless communication network; or
a predicted future operational performance degradation of the wireless communication network.

17. The system of claim 10, wherein the first application server is configured to:
receive a first application service request associated with a first network service request received by the wireless communication network;

transmit, based at least in part on the first application service request, a second application service request to the third application server;

receive, from the third application server, a response to the second application service request; and transmit a response to the first application service request, based at least in part on the response to the second application service request.

18. The system of claim 10, wherein the third application server is configured to perform at least one of:

authorizing network service requests within the wireless communication network;

monitoring network communication sessions within the wireless communication network; or maintaining subscriber device data and associated network usage data within the wireless communication network.

19. One or more non-transitory computer-readable media storing instructions executable by a processor, wherein the instructions, when executed, cause the processor to perform operations comprising:

receiving a first server performance metric associated with a first charging system node of a wireless communication network, wherein the first server performance metric is associated with a plurality of network service requests processed by the wireless communication network;

receiving a second server performance metric associated with a second charging system node of the wireless communication network, wherein the second server performance metric is associated with the plurality of network service requests;

providing the first server performance metric and the second server performance metric as input to a first machine learning model associated with service degradation and to a second machine learning model associated with anomaly detection or prediction;

determining a third charging system node of the wireless communication network, based at least in part on an output of the first machine learning model or the second machine learning model; and initiating a network operations process associated with the third charging system node.

20. The one or more non-transitory computer-readable media of claim 19, wherein initiating the network operations process comprises:

initiating execution of a diagnostic process on the third charging system node; and determining, based at least in part on the diagnostic process, a server repair process for the third charging system node.

* * * * *